United States Patent [19]
Kawamura et al.

[11] Patent Number: 5,908,884
[45] Date of Patent: Jun. 1, 1999

[54] RADIATION SHIELDING MATERIAL AND PRODUCING METHOD THEREOF

[75] Inventors: Toshio Kawamura; Toshihisa Adachi; Mitsunori Kobayashi, all of Hyogo, Japan

[73] Assignee: Sumitomo Electric Industries, Ltd., Osaka, Japan

[21] Appl. No.: 08/931,617

[22] Filed: Sep. 16, 1997

[30] Foreign Application Priority Data

Sep. 24, 1996 [JP] Japan ..................................... 8-251489
Sep. 1, 1997 [JP] Japan ..................................... 9-235550

[51] Int. Cl.$^6$ ............................... G21F 1/10; C08K 3/10; C08K 3/08; C08K 3/22
[52] U.S. Cl. ..................................... 523/515.1; 250/515.1; 252/478; 524/406; 524/408; 524/431; 524/439; 524/440
[58] Field of Search ..................................... 523/136, 137; 524/406, 439, 408, 440, 431; 250/515.1, 516.1, 517.1, 518.1, 519.1; 252/500, 502, 503, 506, 511, 512, 514, 515, 518, 478

[56] References Cited

U.S. PATENT DOCUMENTS

| | | | |
|---|---|---|---|
| 2,944,042 | 7/1960 | Anderson | 524/406 |
| 3,177,177 | 4/1965 | Bobear | 524/406 |
| 3,609,372 | 9/1971 | Vogel | 523/136 |
| 4,375,523 | 3/1983 | Hatanaka et al. | 524/406 |
| 4,545,926 | 10/1985 | Fouts, Jr. et al. | 252/502 |
| 4,545,927 | 10/1985 | Railsback | 252/515 |
| 5,001,354 | 3/1991 | Gould et al. | 250/516.1 |
| 5,548,125 | 8/1996 | Sandbank | 250/515.1 |

FOREIGN PATENT DOCUMENTS

| | | | |
|---|---|---|---|
| 62-12896 | 1/1987 | Japan | G21F 1/10 |
| 62-124133 | 6/1987 | Japan | C08L 21/00 |
| 62-212465 | 9/1987 | Japan | C08L 101/00 |
| 2-77696 | 3/1990 | Japan | G21F 1/10 |
| 3-12597 | 1/1991 | Japan | G21F 3/035 |
| 3-12598 | 1/1991 | Japan | G21F 3/035 |
| 8-110393 | 4/1996 | Japan | G21F 1/10 |
| 8-122492 | 5/1996 | Japan | G21F 1/10 |

*Primary Examiner*—Peter A. Szekely
*Attorney, Agent, or Firm*—Sughrue, Mion, Zinn, Macpeak & Seas, PLLC

[57] ABSTRACT

Tungsten powder which is a material of high radiation absorptivity is dispersed into unvulcanized fluoro rubber in advance so that the mixture is vulcanized and molded. As the powder of material of high radiation absorptivity, powder having an F.s.s.s. particle size not larger than 50 $\mu$m is used. Further, in the case where a mixture of powder having an F.s.s.s. particle size in a range of from 5 $\mu$m to 50 $\mu$m, and powder having an F.s.s.s. particle size in a range of from 0.5 $\mu$m, to 5 $\mu$m, is used as the powder of material of high radiation absorptivity, the powder of material of high radiation absorptivity has good tensile strength, good extensibility and more excellent radiation shielding ability, when the weight of the powder having a particle size in a range of from 4 $\mu$m to 100 $\mu$m is in a range of from 60% by weight to 95% by weight, and the weight of the powder having a particle size smaller than 4 $\mu$m is in a range of from 5% by weight to 40% by weight. Both the powder and the vulcanized rubber containing carbon powder have electrical conductivity, so that electromagnetic wave shielding ability is added. In addition, the vulcanized rubber is vulcanized fluoro rubber which is excellent in heat resistance and chemical resistance.

12 Claims, No Drawings

RADIATION SHIELDING MATERIAL AND PRODUCING METHOD THEREOF

BACKGROUND OF THE INVENTION

1. Field of the Invention

The present invention relates to a material for shielding radiation and a producing method thereof, and particularly to a shielding material for radiation therapy and a radiation shielding material used in the field of radiation shielding relevant to atomic energy, an industrial and medical radiographic inspection machine, and the like.

2. Description of the Related Art

In the field of radiation shielding, a required amount of radiation need be radiated only to a target region in radiation therapy and measurement to avoid irradiation to other, unnecessary regions to thereby prevent the destruction of normal cells and prevent unnecessarily excessive radiation exposure. Because it is difficult to give irradiation only to a target region for radiation shielding, however, a shielding material for shielding radiation is used in regions other than the necessary region.

Conventionally, a material prepared by mixing lead, a lead compound, a lead alloy, antimony, or the like, into resin or rubber is generally used as such a radiation shielding material for radiation protection clothing, or the like. In the case of relatively weak radiation, an acryl plate, or the like, is used. In addition, a tungsten plate is used as the radiation shielding material.

In the case where lead or a lead alloy is used as the radiation shielding material, there are a method in which a mold for obtaining a predetermined shape is produced so that lead or a lead alloy is melted and cast into the mold, and a method in which lead or lead alloy balls having a diameter of the order of mm are produced and filled into a molding flask which has a predetermined shape.

There are, however, various problems when radiation shielding materials produced by the aforementioned methods are used. First, in the case where lead or a lead alloy is used as the radiation shielding material, the cost for melting the lead or lead alloy and producing the mold to obtain a predetermined shape becomes very expensive, but also worsening working environment, bad influence on a human body, or the like, becomes a problem in the case of melting the lead or lead alloy. Furthermore, there arises a sanitary problem that corrosion occurs in a surface of the radiation shielding material after the predetermined shape is obtained, and that the corrode component may be separated when the radiation shielding material is handled.

Furthermore, since the melting point of the lead alloy is not higher than about 80° C., there arises a problem that heating at about 100° C. in hot water for sterilization cannot be performed when the lead alloy is used for medical purposes, and the lead alloy cannot be used for piping, or the like, in a nuclear-power generating station, or the like, requiring heat resistance of about 200° C.

On the other hand, in the case where an acryl plate, or the like, is used as the radiation shielding material, the thickness of the shielding material is necessary to be large because the radiation shielding ability of the acryl plate is low. Accordingly, mechanical processing such as cutting, or the like, is not easy, so that exclusive equipment is required and such an exclusive equipment is expensive. Furthermore, the acryl plate cannot be used for medical purposes because the acryl plate which is a radiation shielding material is dissolved in an organic solvent used for sterilization.

Furthermore, in the case where a tungsten plate is used as the radiation shielding material, there is generally a method in which the tungsten plate is rolled or cut into a predetermined shape. There arises a problem that the material may be broken by its own weight or shock so as not to be able to be used when ill-treated because the material is high in specific gravity, hard and brittle. Further, there arises a problem that the material becomes expensive because cutting or processing the material is not easy.

Furthermore, in the case where the radiation shielding materials as described above are used in a region such as a movable portion, or the like, to which stress is applied, breaking, or the like, caused by stress or fatigue occurs in each of the aforementioned materials so that the materials cannot be used in practice. In the case where the subject to be shielded has a more complex rough surface, it becomes difficult to make the material come close to the subject easily because each of the aforementioned materials has no elastic deformability. Accordingly, a space is generated between the shielding material and the subject to be shielded, so that a radiation generated secondarily at the time of radiation shielding is scattered in the space. There arises a problem in the lowering of radiation shielding accuracy, or the like.

Next, in the case where a shielding material prepared by mixing lead, a lead compound (lead oxide, etc.), or the like, into resin or rubber as disclosed in Unexamined Japanese Patent Publication (kokai) Nos. Sho-62-124133, Sho-62-212465, Hei-2-77696 and Hei-8-110393 is used, the thickness or size of the shielding material is necessary to be large in order to obtain required radiation shielding ability because the radiation shielding ability of the material is low. There arises a problem when the material is used in a limited space. This problem arises also in the case where antimony is used as a compounding ingredient. Furthermore, because the aforementioned material which is resin or rubber mixed with lead, a lead compound (lead oxide, etc.), or the like, or a material using antimony as a compounding ingredient is, in most cases, easily dissolved in an organic solvent, or the like, there arises a further problem that the material cannot endure a high temperature of about 200° C. Furthermore, in the case of the lead-containing material, bad influence of lead on environment and on a human body at the time of handling and aborting the material, or the like, becomes a problem.

On the other hand, Unexamined Japanese Patent Publication (kokai) Nos. Hei-3-12597 and Hei-3-12598 disclose a radiation protection glove prepared by mixing gadolinium oxide, zirconium hydroxide, boron carbide, lead and lead oxide powder as a neutron and γ-ray shielding material into natural or synthetic rubber. Also in this material, the thickness of the material is necessary to be large in order to obtain required radiation shielding ability because the radiation shielding ability of the material is low. Accordingly, there arises a problem that the feeling of use of the glove is worsened.

Further, in order to solve the aforementioned problem, as the material, Unexamined Japanese Patent Publication (kokai) No. Hei-8-122492 discloses a resin material. Because the resin material is easily dissolved in an organic solvent, or the like, to cause a problem that the material cannot endure a high temperature of about 200° C. Furthermore, because a solvent is used for dissolving at least one of a resin agent and a plasticizer, tungsten may be precipitated in a process in which the solvent is dried to be removed. There arises a problem that tungsten tends to be uneven and, accordingly, the radiation shielding ability tends to be uneven.

Further, Unexamined Japanese Patent Publication (kokai) No. Sho-62-12896 discloses a γ-ray shielding material prepared by filling specific silicone rubber with tungsten powder. Because this material is designed so that a rubber component is hardened by mixing two solutions, it is difficult to disperse tungsten powder of high specific gravity in the material evenly due to gravity, or the like, while the rubber component is hardened. As a result, uniform radiation shielding ability cannot be obtained.

Furthermore, because silicone rubber used in the material is low in tearing strength, abrasion resistance and flex-crack resistance and inferior in oil resistance, there arises a problem in that the radiation shielding material tends to be broken or abraded so as to be unable to be used for a long time when the radiation shielding material is used in a region such as a movable portion, or the like, to which stress is applied. Further, there arises a problem in that the material may be in contact with an oil component at a high temperature so as to be unable to be used when the material is used in piping, or the like, in a nuclear-power generating station, or the like.

As described above, lead plate, a lead alloy plate, an acryl plate, a tungsten plate, or the like, is used as the conventional radiation shielding material. These materials have problems in increase of cost for molding and processing to obtain a predetermined shape, in occurrence of bad influence on environment, in impossibility of use at a high temperature, in necessity of dissolving in an organic solvent or the like, in necessity of increasing the size of the material because of low radiation shielding ability, in impossibility of use in a movable region, and the like. Furthermore, in the case where a tungsten plate is used, there arises a problem that it is very difficult to handle the tungsten plate.

SUMMARY OF THE INVENTION

It is an object of the present invention to provide a radiation shielding material which has high radiation shielding ability; is easy to be molded and processed at low cost; is easy to handle; is excellent in heat resistance and chemical resistance; has elastic deformability for use in a movable region; and has no environmental problem; and to provide a producing method thereof.

To achieve the foregoing object, the radiation shielding material according to the present invention comprises powder of material of high radiation absorptivity, and vulcanized rubber, wherein the whole of the material has elastic deformability.

Further, the method for producing a radiation shielding material provided by the present invention comprises the steps of: dispersing powder of material of high radiation absorptivity into unvulcanized rubber in advance; and vulcanizing the unvulcanized rubber to form a predetermined shape.

According to the present invention, it is possible to provide the radiation shielding material which is sanitary, has high radiation shielding ability, is easy to be molded and processed at low cost, is easy to be handled, is excellent in heat resistance chemical resistance, and has elastic deformability adapted to a movable region, and it is possible to provide the producing method thereof.

DETAILED DESCRIPTION OF THE INVENTION

The present invention will be described in detail as follows.

In the present invention, the radiation shielding material according to the present invention includes powder of material of high radiation absorptivity, and vulcanized rubber, so that the whole of the material has elastic deformability.

Further, in the method for producing a radiation shielding material according to the present invention, powder of material of high radiation absorptivity is dispersed into unvulcanized rubber in advance; and the unvulcanized rubber is vulcanized to form a predetermined shape.

In the radiation shielding material according to the present invention, material of high radiation absorptivity mainly having specific gravity not smaller than 12 (larger than the specific gravity of lead or a lead alloy) is used in the form of powder. The powder is mixed into vulcanized rubber to form a mixture so that respective particles of the powder are enclosed in the vulcanized rubber. Accordingly, the material has elastic deformability as a whole.

Accordingly, the radiation shielding material according to the present invention is easy to handle and very simple to process so that the processing cost can be reduced greatly, as well as there is no breaking, or the like, due to its own weight or shock even in the case where the content of the material of high radiation absorptivity is made large in order to obtain high radiation shielding ability.

Furthermore, since the material has elastic deformability as a whole, the material can be used for radiation shielding in a movable region, or the like, in which the conventional material cannot be used, and the material can be easily made to come close to a rough subject for the purpose of radiation shielding in the rough subject by using its elastic deformability.

Moreover, not only the material is made to come close to the rough subject, but also if the material has an adhesive layer on one side or both side thereof, it is possible to wind the material around a piping to thereby adhering and fixing the material therearound.

In addition, the radiation shielding material is designed so that material of high radiation absorptivity is enclosed in vulcanized rubber. Consequently, there is no occurrence of sanitary disadvantages such as stain due to separation of the powder, corrosion of the powder material, and the like, when the material is handled.

Next, when the specific gravity of the material of high radiation absorptivity is not smaller than 12, radiation shielding ability equal to or higher than the radiation shielding ability in use of a material such as lead, a lead alloy, or the like, having specific gravity smaller than 12 is obtained even if the percentage of the material of high radiation absorptivity contained in the material according to the present invention is low. Since the specific gravity of tungsten is 19.3, the specific gravity of a tungsten compound or a tungsten based alloy can be set to be not smaller than 12.

When tungsten, a tungsten compound or a tungsten based alloy is used as the material of high radiation absorptivity (the γ-ray absorption coefficient ($cm^{-1}$) of tungsten is not smaller than about 1 when the energy of γ-rays is 1.5 MeV and, similarly, the γ-ray absorption coefficient of a tungsten compound or a tungsten based alloy is considered to be large), there can be provided a sanitary and safe product in which not only high radiation shielding ability can be obtained, but also bad influence on environment and on a human body is almost eliminated compared with the case where lead (having a γ-ray absorption coefficient ($cm^{-1}$) of about 0.6 for the γ-ray energy of 1.5 MeV) or a lead alloy is used.

The material of high radiation absorptivity is used in the form of powder. The content of the powder is preferably from 80% by weight to 99% by weight, (the most preferred range is from 85% by weight to 97% by weight). If the content of the powder is smaller than 80% by weight, the radiation shielding ability of the material is lowered as a whole so that the material cannot be put into practical use. If the content of the powder is contrariwise larger than 99% by weight, particles of the powder cannot be completely enclosed in the vulcanized rubber so that the elastic deformability of the material cannot be kept as a whole even in the case where rubber having specific gravity which is as low as possible is used as the vulcanized rubber.

Preferably, the powder of material of high radiation absorptivity has an F.s.s.s. (Fisher sub-sieve sizer) particle size (which is a mean particle size measured by an apparatus in accordance with JIS H 2116 and hereinafter referred to as F.s.s.s. particle size) not larger than 50 $\mu$m. Even in the case where the F.s.s.s. particle size is not larger than 50 $\mu$m, some particles have particle sizes larger than 50 $\mu$m as practically measured individual values. Because the F.s.s.s. particle size is a mean particle size, the powder has a particle size distribution with respect to the mean particle size. By selecting the F.s.s.s. particle size to be not larger than 50 $\mu$m, particles of the powder tend to be enclosed in the vulcanized rubber easily so that the elastic deformability of the material is kept easily as a whole. Accordingly, the problem in occurrence of cracks, or the like, at the time of handling the material is eliminated so that the reliability thereof is improved greatly.

When the powder of material of high radiation absorptivity contains powder having a particle size not smaller than 4 $\mu$m but not larger than 100 $\mu$m in a range of from 60% by weight to 95% by weight, and powder having a particle size smaller than 4 $\mu$m in a range of from 5% by weight to 40% by weight, the apparent density (mass per unit volume of solid particles according to JIS Z 9211) of the mixture powder can be increased compared with the case where powder has an equal particle size. Accordingly, when materials having the same elastic deformability are compared with each other, the material using the aforementioned mixture powder can be designed so that the rate of the powder to the whole of the material can be increased and, consequently, the radiation shielding ability of the material as a whole can be increased.

Specifically, as the powder of material of high radiation absorptivity, the above possibility can be realized easily by using mixture of powder having an F.s.s.s. particle size in a range of from 5 $\mu$m to 50 $\mu$m, that is, having a mean particle size in a range of from 5 $\mu$m to 50 $\mu$m when measured by using an apparatus according to JIS H 2116, and powder having an F.s.s.s. particle size in a range of from 0.5 $\mu$m, to 50 $\mu$m, with a mixing proportion corresponding to the particle size distribution.

Although the kind of vulcanized rubber used in the present invention is not limited specifically, it is preferable to use fluoro rubber. Accordingly, it is possible to provide a radiation shielding material having elastic deformability which is capable of being used under an environment of about 200° C. at an average, and enduring almost all organic solvents and chemicals except ketones. Further, in the case where peroxide is used as a vulcanizer for the fluoro rubber, it is possible to provide a radiation shielding material particularly excellent in chemical resistance. In addition, in the case where polyol is used, it is possible to provide a radiation shielding material particularly excellent in heat resistance. In addition, it is possible to use ethylene-propylene rubber having heat-resistance higher than that of general resin, nitril rubber having high oil-resistance, natural rubber and styrene rubber which has an advantage in view of cost, and the like as the vulcanized rubber in accordance with the using environment.

Further, when an electrically conductive material such as tungsten powder, or the like, is used as the material of high radiation absorptivity and carbon powder (also called carbon black), or the like, is added to the vulcanized rubber to give electric conductivity to the whole of material, the material is used as an electromagnetic wave shielding material as well as a radiation shielding material.

Moreover, it is possible to add various capacities to the material according to the present invention by using vulcanized rubber. For example, if the composition of the vulcanized rubber is restricted to have no problem in view of food hygiene and tungsten is used as the material according to the present invention, it is possible to use the radiation shielding material as a part, which directly contact with foods, of an X-ray inspection device for food and the like. Further, if an antibacterial agent is dispersed into the vulcanized rubber, it is possible to obtain excellent antibacterial action. Thus, in view of food hygiene, it is possible to provide an radiation shielding material which is extremely excellent compared with the conventional one. In addition, the hardness and the strength of the material can be varied by the kind and the amount of the filler dispersed therein. Accordingly, it is possible to provide various kinds of radiation shielding materials having mechanical natures corresponding to their usage and shape from thin and strong one capable of maintaining the maximum elastic deformability to thick and hard one capable of being metal working with remaining the elastic deformability of rubber.

On the other hand, the radiation shielding material according to the present invention can be produced by dispersing powder of material of high radiation absorptivity into unvulcanized rubber in advance; and vulcanizing the unvulcanized rubber to form a predetermined shape. Since this method can be carried out easily by means of conventional equipment for producing vulcanized rubber products, the producing cost can be reduced.

Further, tungsten, a tungsten compound or a tungsten based alloy as the material of high radiation absorptivity is used so as not to hardly occur decomposition or chemical reaction in the powder of the above material in the producing process. Accordingly, the material according to the present invention has advantages that the material can be recycled, and worsening of working environment, bad influence on a human body, or the like, is little compared with the conventional shielding material of lead or a lead alloy. The present invention will be further described below on the basis of Examples thereof.

EXAMPLES

Example 1

Eighty eight % by weight of tungsten powder having an F.s.s.s. particle size of 3 $\mu$m and 12% by weight of unvulcanized fluoro rubber containing a suitable amount of peroxide as a vulcanizer are weighed, and the tungsten powder and the unvulcanized fluoro rubber with a vulcanizer were mixed in an open roll mill for 15 minutes. Then, a 1 mm-thick vulcanized rubber sheet (hereinafter referred to as sample 1) was produced by pressing the mixture. On the other hand, 95% by weight of tungsten powder having the same F.s.s.s. particle size as described above and 5% by weight of unvulcanized EPDM rubber (ethylene-propylene rubber, hereinafter referred to as EPDM) containing a suitable amount of sulfur as a vulcanizer are weighed, and the latter was dispersed in the former in the same manner as described above to thereby prepare another sample (hereinafter referred to as sample 2).

The respective sections of these samples 1 and 2 were observed by using an SEM (scanning electron microscope, hereinafter referred to as SEM). As a result, it was confirmed that tungsten powder was dispersed in a matrix of the vulcanized rubber substantially evenly. The specific gravity of the shielding material in each of the samples 1 and 2 was about 9 as a whole. As an example of radiation shielding ability, radiation absorbing characteristic in an X ray of 6 MV was measured. As a result, the radiation absorbing characteristic of each sample was about 96% of that of a lead alloy plate having the same thickness and was twice as much as that of an available lead-containing sheet (specific gravity: about 4) having the same thickness. That is, it was confirmed that each sample had radiation shielding ability which was substantially equal to that of the lead alloy and superior to that of the lead-containing sheet.

The tensile strength measured in each of the samples 1 and 2 was not smaller than 60 Kg/cm². It was confirmed that each sample was prevented from being hung or deformed by its own weight in use. Further, the extensibility (G.L.=100 mm, hereinafter the same rule is applied) was not smaller than 200%, that is, each sample had elastic deformability.

It was confirmed that these samples 1 and 2 could be cut easily compared with a lead plate having the same thickness, and these samples 1 and 2 had elastic deformability in which each sample could be made to come close to a fine curved surface. When bending was repeated, the lead plate having the same thickness was broken by fatigue in the case where bending at 90 degrees was repeated 50 times (one reciprocating bending was counted as one time), whereas there was no influence on the samples 1 and 2.

When an iron ball having a weight of 5 kg was naturally dropped onto each of the samples 1 and 2 from a position 2 m-higher than the position of the sample, there was no breaking such as cracks, or the like, in each sample. When a tungsten plate having the same size was subjected to the same dropping test as described above, cracks occurred.

The samples 1 and 2 were exposed to air while the temperature of the air was being changed variously. As a result, the extensibility and tensile strength of the sample 1 were kept at least for 56 days at 200° C. The extensibility and tensile strength of the sample 2 were lowered only in 1 day at 200° C. but were kept at least for 56 days at 100° C.

The samples were immersed in various kinds of chemicals at room temperature. As a result, the sample 1 was little swollen by chemicals except ketones such as methylethyl ketone, and the like, that is, it was confirmed that the sample 1 was not dissolved at all. The sample 2 was little dissolved in chemicals except gasoline and benzene.

The samples 1 and 2 and the lead alloy were left under the environment of a temperature of 60° C. and a humidity of 90% for 100 hours. As a result, the occurrence of corrosion was observed in the lead alloy, whereas there was no occurrence of corrosion in the samples 1 and 2.

Example 2

Fifteen % by weight of tungsten powder having an F.s.s.s. particle size of 1 μm and 85% by weight of tungsten powder having an F.s.s.s. particle size of 8 μm were mixed in advance. Then, the mixture powder was weighed by 90% by weight and unvulcanized fluoro rubber containing a suitable amount of peroxide as a vulcanizer was weighed by 10% by weight, and they were further mixed in an open roll mill for 15 minutes. Then, a 1 mm-thick vulcanized rubber sheet (hereinafter referred to as sample 3) was produced by pressing. On the other hand, the aforementioned mixture powder was weighed by 96% by weight and unvulcanized EPDM rubber containing a suitable amount of sulfur as a vulcanizer was weighed by 4% by weight, and they were used in the same manner as described above to thereby prepare a further sample (hereinafter referred to as sample 4).

The respective sections of these samples 3 and 4 were observed by using an SEM. As a result, it was confirmed that tungsten powder was dispersed in a matrix of the vulcanized rubber substantially evenly. The specific gravity of the shielding material in each of the samples 3 and 4 was about 10 as a whole, so that the radiation shielding ability of each of the samples 3 and 4 was improved by about 10% compared with the samples 1 and 2 produced in the same manner by using only powder having particles of the same particle size.

Further, the tensile strength, extensibility, heat resistance, chemical resistance and other characteristic of the samples 3 and 4 were substantially the same as those of the samples 1 and 2.

Example 3

Further, tungsten powder having an F.s.s.s. particle size of 1 μm and tungsten powder having an F.s.s.s. particle size of 10 μm were mixed with various mixture proportions in advance. This mixture powder and unvulcanized fluoro rubber containing a suitable amount of peroxide as a vulcanizer were weighed and mixed in an open roll mill for 15 minutes. Then, a 1 mm-thick vulcanized rubber sheet (hereinafter referred to as sample 5) was produced by pressing.

Here, the mixture proportion of the mixture powder and fluoro rubber was determined so that the tensile strength and extensibility of the sample 5 thus produced were the same as those of the sample 1 (the tensile strength was not smaller than 60 Kg/mm² and the extensibility was not lower than 200%). Here, the particle size distribution of tungsten powder remaining after removal of the rubber component in the sample 5 was measured, and the percentage by weight of powder having a particle size in a range of from 4 μm to 100 μm was represented by X and the percentage by weight of powder having a particle size smaller than 4 μm was represented by Y. The value of X, the value of Y, the mixture proportion of the mixture powder and fluoro rubber and the specific gravity thereof were as shown in Table 1.

TABLE 1

| X (wt. %) | Y (wt. %) | mixture powder (wt. %) | fluoro rubber (wt. %) | specific gravity | extensibility (%) |
|---|---|---|---|---|---|
| 30 | 70 | 84.1 | 15.9 | 7.8 | 200 or more |
| 55 | 45 | 88.2 | 11.8 | 9.2 | 200 or more |
| 60 | 40 | 88.9 | 11.1 | 9.5 | 200 or more |
| 65 | 35 | 89.3 | 10.7 | 9.7 | 200 or more |
| 70 | 30 | 89.7 | 10.3 | 9.8 | 200 or more |
| 75 | 25 | 90.0 | 10.0 | 10.0 | 200 or more |
| 80 | 20 | 90.2 | 9.8 | 10.1 | 200 or more |
| 85 | 15 | 90.0 | 10.0 | 10.0 | 200 or more |
| 90 | 10 | 89.7 | 10.3 | 9.8 | 200 or more |
| 95 | 5 | 89.0 | 11.0 | 9.5 | 200 or more |
| 97 | 3 | 88.5 | 11.5 | 9.3 | 200 or more |
| 100 | 0 | 87.9 | 12.1 | 9.1 | 200 or more |

From the aforementioned result, in the samples having the same tensile strength and extensibility as those of the sample 1, the specific gravity was not smaller than 9.5 in each and every sample containing 60% by weight to 95% by weight both (X value in the above table) of powder having a particle size in a range of from 4 μm to 100 μm, and 5% by weight to 40% by weight (Y value in the above table) of powder having a particle size smaller than 4 μm. As an example of the radiation shielding ability of these samples, radiation absorbing characteristic was measured in an X ray of 6 MV. As a result, it was confirmed that these samples exhibited absorptivity obtained by multiplying the absorptivity of a lead alloy having the same thickness by a factor of from 1 to 1.1 and had more excellent radiation shielding ability than that of the lead alloy.

Example 4

Further, a suitable amount of carbon black was mixed with a mixture of 92% by weight of tungsten powder having an F.s.s.s. particle size of 3 μm and 8% by weight of unvulcanized SBR rubber (general synthetic rubber of styrene and butadiene) containing a vulcanizer in order to give electrical conductivity to the mixture. These materials were mixed in an open roll mill for 5 minutes. Then, a 1 mm-thick vulcanized rubber sheet (hereinafter referred to as sample 6) was produced by pressing. The measured radiation shielding ability of the sample 6 was reduced by about 20% compared with that of the sample 1, but electromagnetic wave shielding ability was obtained newly by giving electrical conductivity to the sample 6. That is, it was confirmed that electromagnetic wave shielding ability could be added to the radiation shielding ability in the material according to the present invention.

Incidentally, tantalum (specific gravity: 16.6), rhenium (specific gravity: 21.0), osmium (specific gravity: 22.5), compounds or alloys thereof, etc., (whose γ-ray absorption coefficient ($cm^{-1}$) is in the range of about 0.7 to 1.2 when the energy of γ-rays is 1.5 MeV) other than tungsten, tungsten compounds and tungsten based alloys may be used singly or in combination as the material of high radiation absorptivity. The kind of the rubber material, the kind of the vulcanizer and the mixture proportion thereof can be selected suitably correspondingly to the kind of powder such as tungsten powder, or the like, required radiation shielding ability, specific gravity and physical properties, and so on. In addition, carbon powder, or the like, can be added to the material according to the present invention in order to perform coloring, changing of physical properties or characteristic, etc.

What is claimed is:

1. A radiation shielding material comprising:

powder of material of high radiation absorptivity mainly having specific gravity not smaller than 12, and vulcanized rubber so that said radiation shielding material has elastic deformability for withstanding stress caused by bending, strength for withstanding heat and chemical cleaning, and a radiation shielding ability, wherein a Fisher sub-sieve sizer particle size of said powder of material of high radiation absorptivity is not larger than 50 μm and, wherein said powder of material of high radiation absorptivity is a mixture powder containing powder having a particle size not smaller than 4 μm but not larger than 100 μm in a range of from 60% by weight to 95% by weight, and powder having a particle size smaller than 4 μm in a range of from 5% by weight to 40% by weight.

2. A radiation shielding material according to claim 1, wherein said powder of material of high radiation absorptivity contains at least one member selected from the group consisting of tungsten, tungsten compounds, and tungsten radical alloys.

3. A radiation shielding material according to claim 1, wherein a content of said powder of material of high radiation absorptivity is more than 80% by weight and up to 99% by weight.

4. A radiation shielding material according to claim 1, wherein said vulcanized rubber is vulcanized fluoro rubber.

5. A radiation shielding material according to claim 1, wherein said vulcanized rubber has electrical conductivity.

6. A radiation shielding material according to claim 1, wherein said powder of material of high radiation absorptivity has γ-ray absorption coefficient ($cm^{-1}$) in the range of about 0.7 to 1.2 when the energy of γ-rays is 1.5 MeV.

7. A method of producing a radiation shielding material comprising the steps of:

dispersing powder of material of high radiation absorptivity mainly having specific gravity not smaller than 12 into unvulcanized rubber in advance; and vulcanizing and forming said unvulcanized rubber into vulcanized rubber having a predetermined shape, strength for withstanding heat and chemical cleaning, deformability and flexibility for withstanding stress caused by bending and radiation shielding ability, wherein powder having a Fisher sub-sieve sizer particle size not larger than 50 μm is used as said powder of material of high radiation absorptivity, and wherein said powder of material of high radiation absorptivity is a mixture containing powder having a Fisher sub-sieve sizer particle size of not smaller than 5 μm but not larger than 50 μm, and powder having a Fisher sub-sieve sizer particle size not smaller than 0.5 μm but smaller than 5 μm.

8. A method for producing a radiation shielding material according to claim 7, wherein said unvulcanized rubber is unvulcanized fluoro rubber.

9. A method for producing a radiation shielding material according to claim 7, wherein an electrical conductivity addition agent is mixed in said unvulcanized rubber and said unvulcanized rubber is vulcanized and formed into a predetermined shape.

10. A method for producing a radiation shielding material according to claim 9, wherein carbon powder is added as said electrical conductivity addition agent.

11. A method for producing a radiation shielding material according to claim 7, wherein at least one member selected from the group consisting of peroxides, and polyols is used as a vulcanizing agent.

12. A method for producing a radiation shielding material according to claim 7, wherein said powder of material of high radiation absorptivity has γ-ray absorption coefficient ($cm^{-1}$) in the range of about 0.7 to 1.2 when the energy of γ-rays is 1.5 MeV.

* * * * *